Aug. 19, 1947.  E. CONTI  2,425,786
MACHINE FOR FORMING DRINKING CUPS
Filed Oct. 26, 1942  9 Sheets-Sheet 1
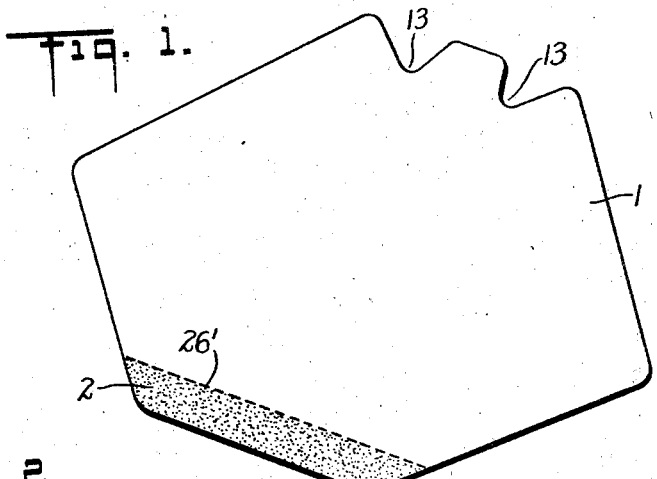
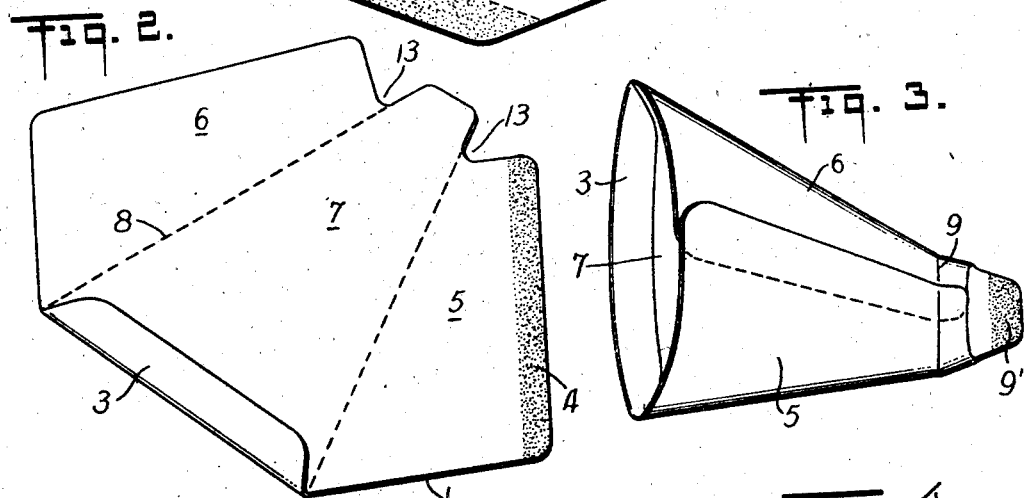
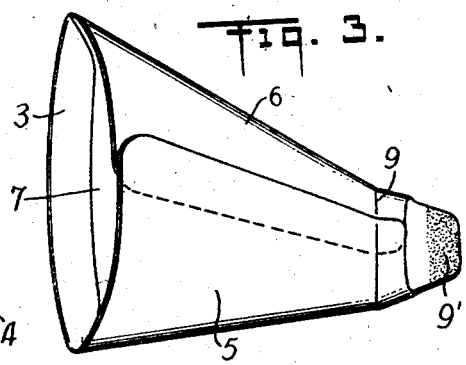
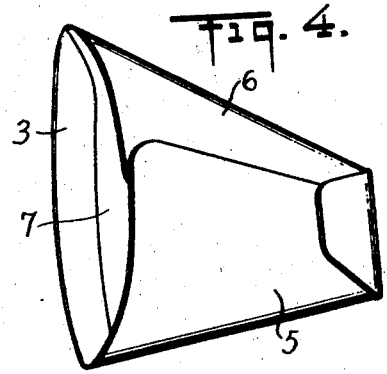
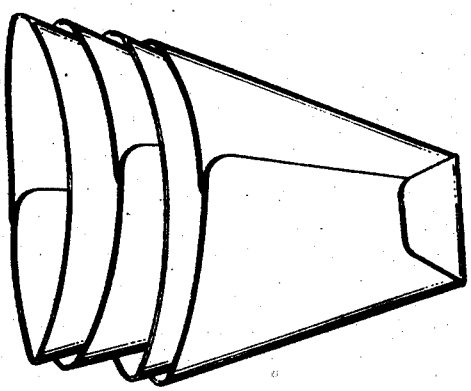
INVENTOR
*Eugene Conti*
BY
*Blair, Curtis + Hayward*
ATTORNEYS

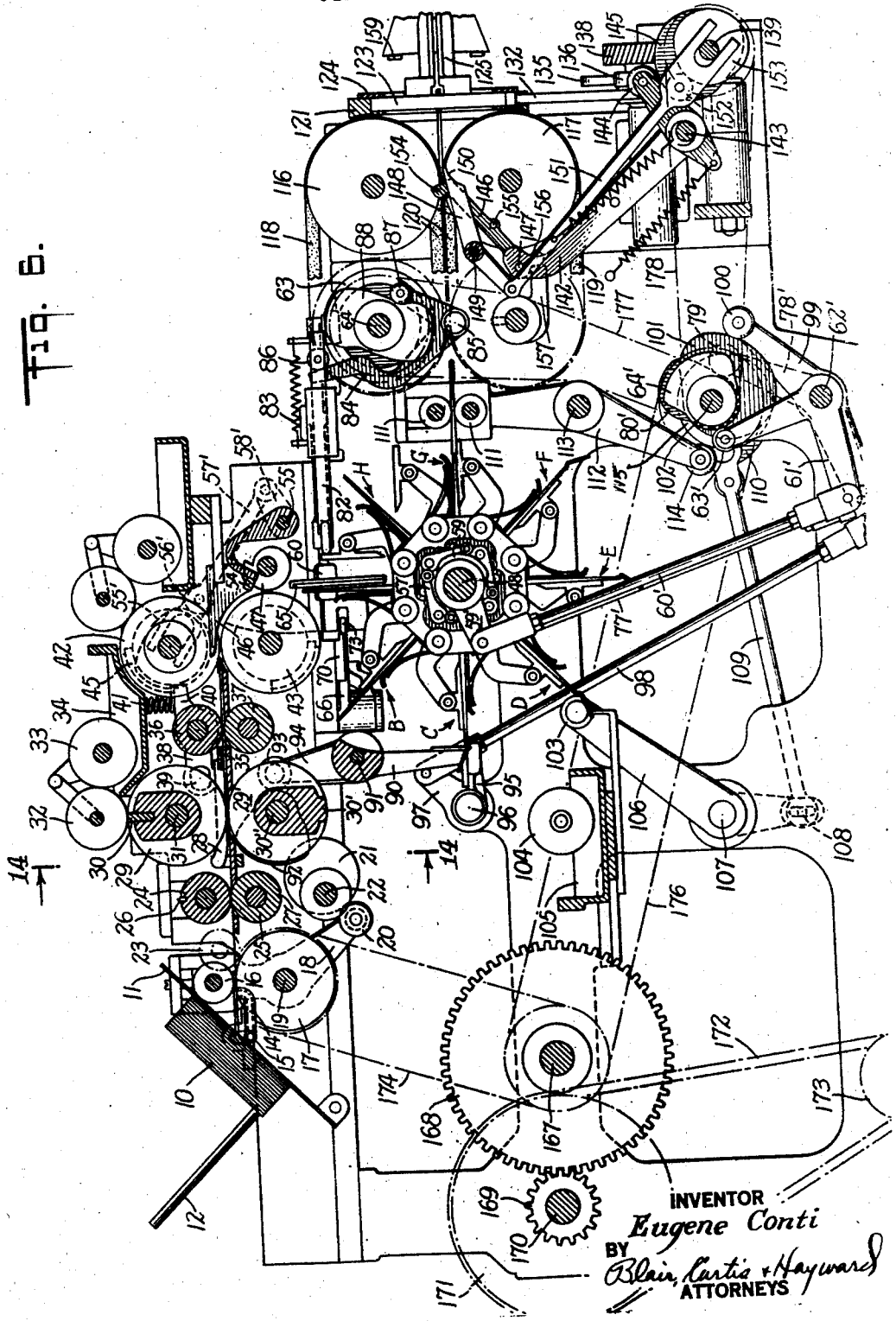

Aug. 19, 1947.  E. CONTI  2,425,786
MACHINE FOR FORMING DRINKING CUPS
Filed Oct. 26, 1942  9 Sheets-Sheet 3

INVENTOR
*Eugene Conti*
BY
*Blair, Curtis & Hayward*
ATTORNEYS

Aug. 19, 1947.  E. CONTI  2,425,786
MACHINE FOR FORMING DRINKING CUPS
Filed Oct. 26, 1942  9 Sheets-Sheet 5

INVENTOR
Eugene Conti
BY
Blair, Curtis & Hayward
ATTORNEYS

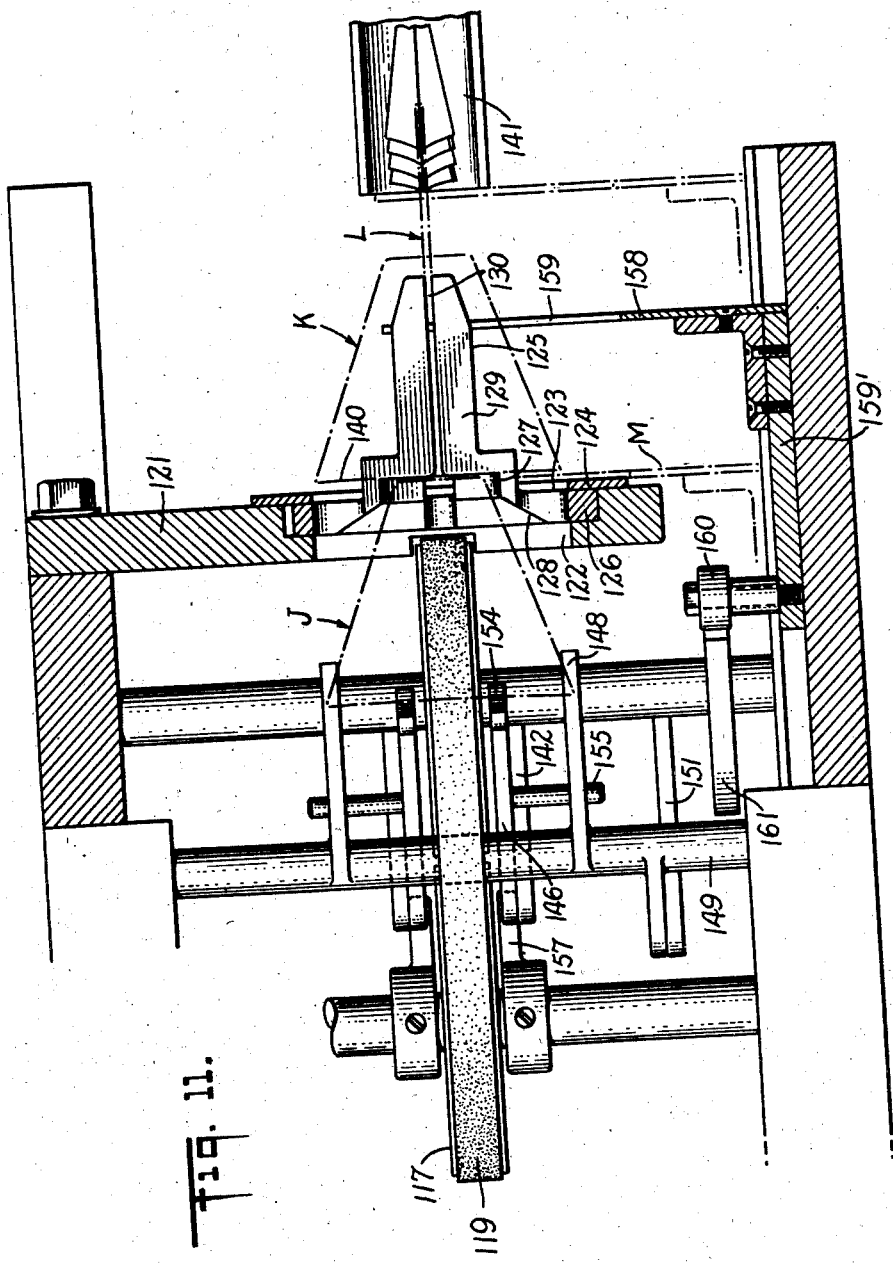

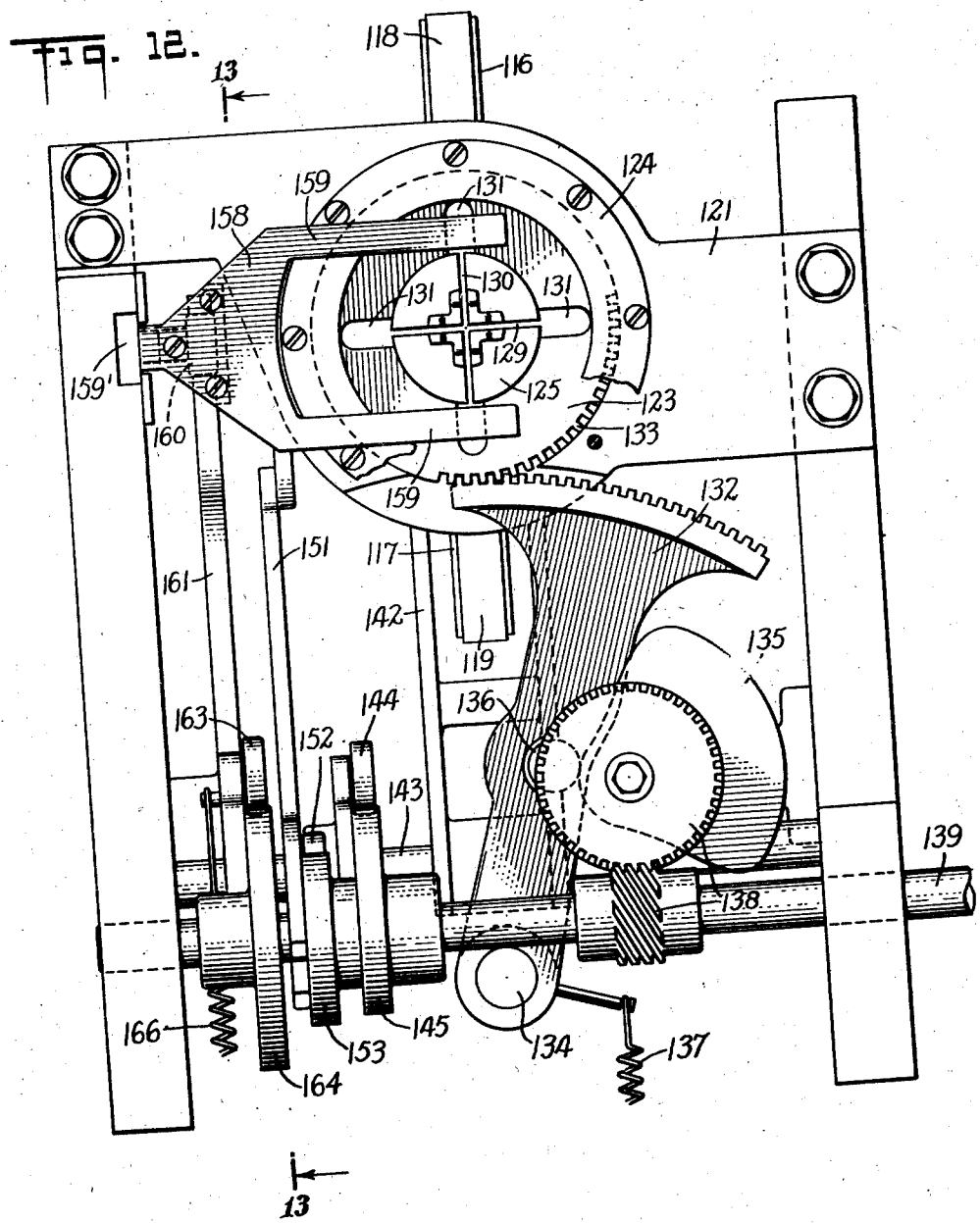

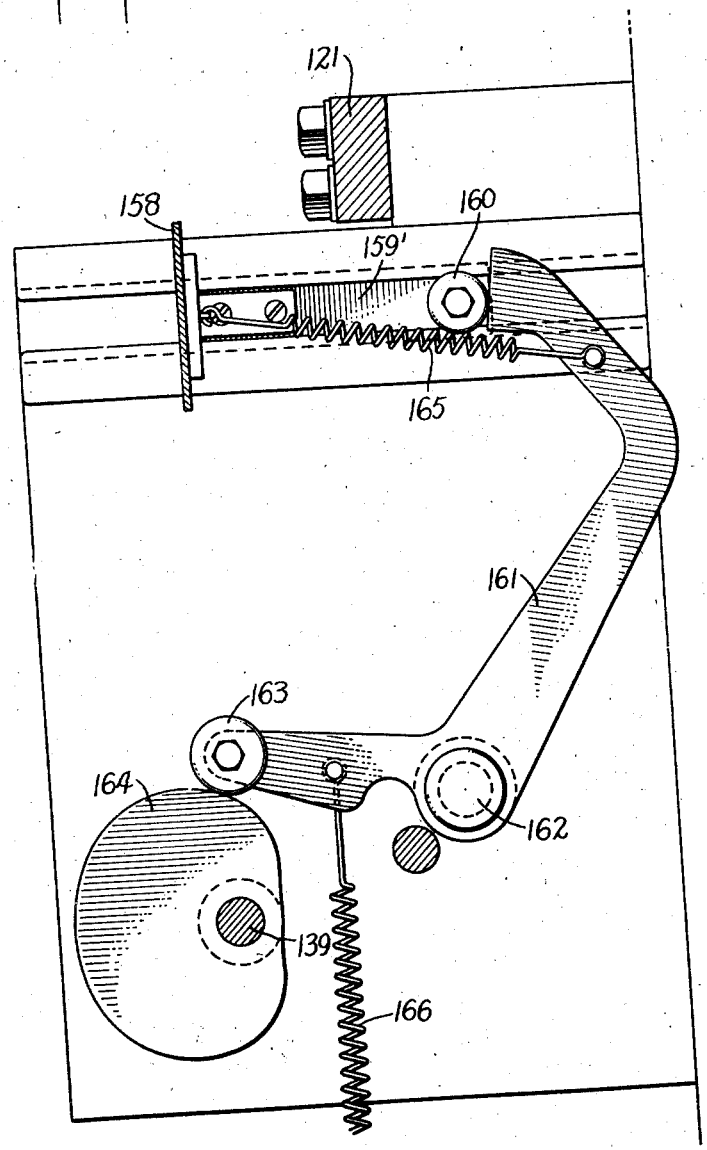

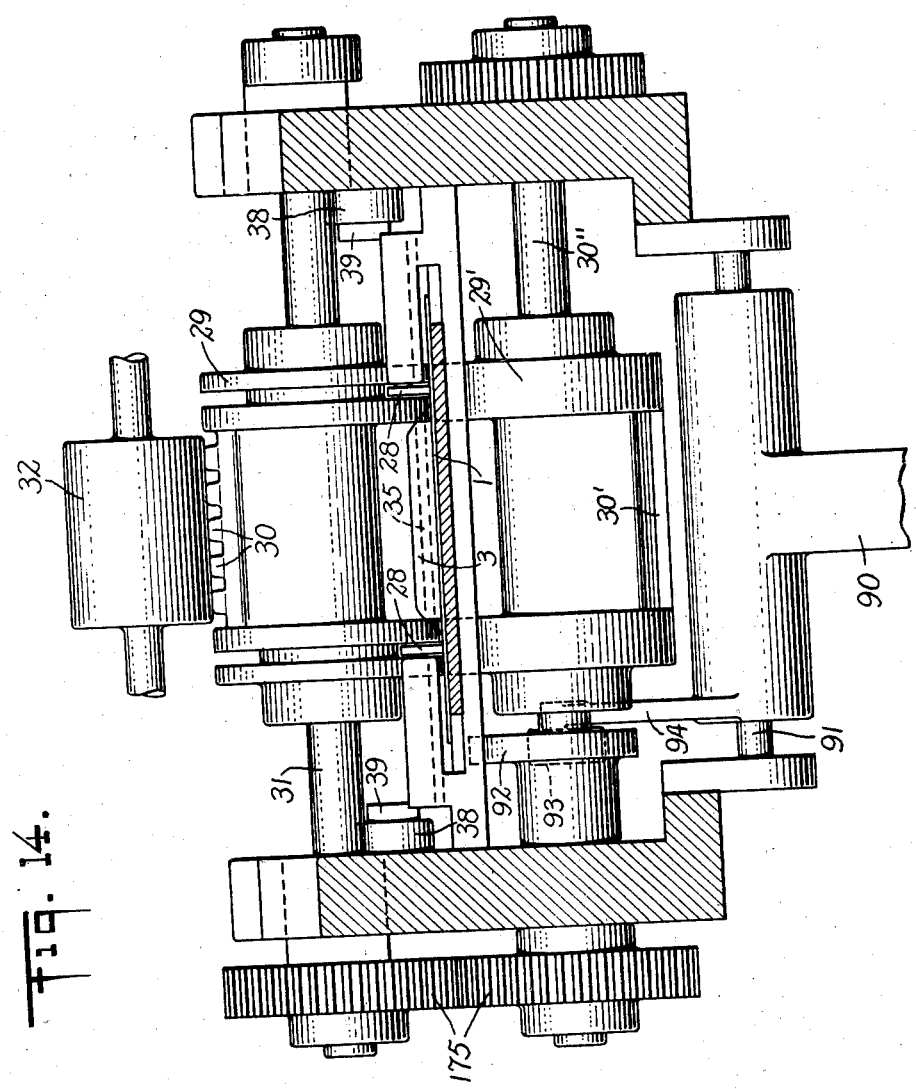

Patented Aug. 19, 1947

2,425,786

UNITED STATES PATENT OFFICE 2,425,786

MACHINE FOR FORMING DRINKING CUPS

Eugene Conti, Jackson Heights, N. Y., assignor to Herz Manufacturing Corporation, a corporation of New York Application October 26, 1942, Serial No. 463,357

16 Claims. (Cl. 93—36.05)

This invention relates to a machine for producing and stacking drinking cups of the open mouth type, which cups may be made of paper or some functionally equivalent material.

An object of the invention resides in providing a machine for forming such cups rapidly and yet so that they will retain their form prior to and during use.

A further object of the invention resides in the provision of a machine for stacking or nesting the formed cups in such manner that the stack will lie in a rectilinear position rather than in a curvilinear position to accomplish the advantageous results hereinafter pointed out.

Other objects of the invention will appear as this description progresses, and it is, therefore, unnecessary to here state the main detail.

The drinking cup produced by this invention is of the type which is usually made of paper, has an open mouth and is tapered toward its base into a wedge shape with the side edges rounded.

In the drawings:

Figures 1 through 4 inclusive show the steps of forming the cup from blank to complete cup.

Figure 5 is a perspective view showing the manner of stacking the cups.

Figure 6 is a vertical longitudinal sectional view of the machine which constitutes an embodiment of my invention and by which the method phase thereof may be carried out.

Figure 11 is a horizontal sectional view of a portion of the cup delivery and stacking mechanism.

Figure 12 is a vertical end view of the delivery and stacking mechanism for the cups.

Figure 13 is a view of a portion of the cup delivery mechanism;

Figure 14 is a vertical sectional view on line 14—14 of Figure 6 looking in the direction of the arrows and showing the position of the blank.

Figure 7:
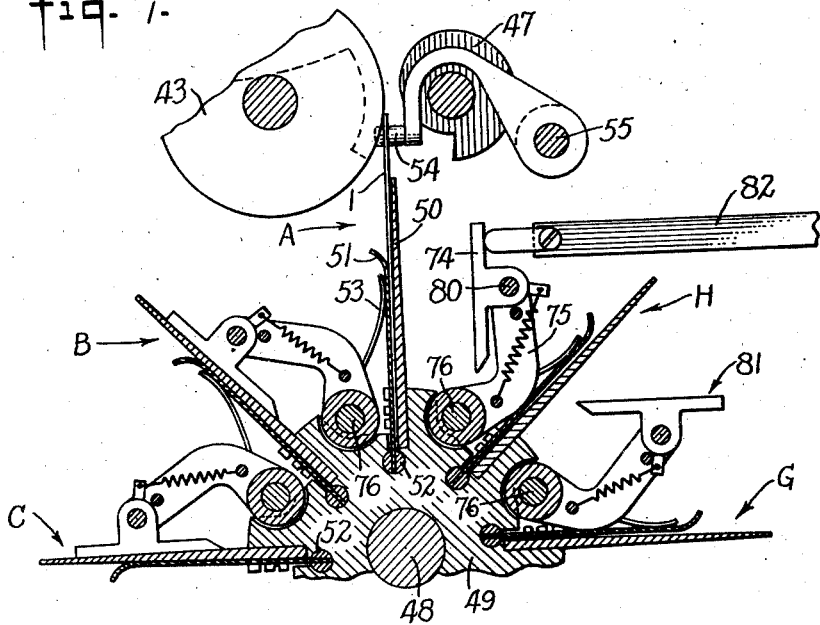
Figure 7 is a fragmentary sectional view of the turret by which the blank is carried during part of its formation into a cup.
Figure 8:
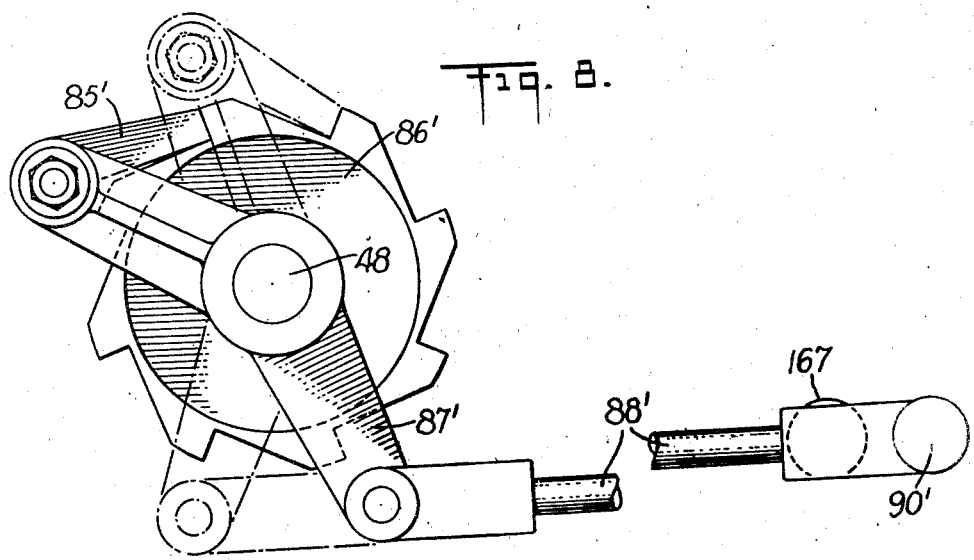
Figure 8 is a view of the mechanism by which the turret is given an intermittent or step-by-step rotation.

In carrying out the method the blank from which the cup is formed is subjected to a series of operations to form the cup. The blank 1 of the form illustrated in Figure 1 of the drawings first has applied thereto an adhesive 2 along one edge which ultimately becomes the drinking edge of the cup. This edge is folded over to form a lip 3 which is held in its folded position by the adhesive 2. The adhesive 4 is applied along one of the edges of one of the wings 5 and 6 of the blank, which wings become one side of the cup arranged opposite the side 7.

The wings are then folded over the side 7 along the areas indicated by the dotted lines 8 so that the adhesive 4 on the wing 5 overlies the adjacent portion of the wing 6 and adheres thereto to secure the edges of the wings together to form the second side of the cup.

These steps transform the blank into the form shown in Figure 3 of the drawings without, however, the small end or base of the partly constructed cup being creased or having adhesive applied thereto. The cup is then creased along the line 9 and the adhesive 9' applied to the protruding end, after which the bottom flap is folded over the adjacent side of the cup and caused to adhere thereto by the adhesive 9'. The finished cup thus produced is illustrated in Figure 4 of the drawings.

The respective operations to produce the finished cup are carried out simultaneously on several blanks, thereby increasing the rapidity of production of the finished article.

It has been the practice to stack or nest this type of cup by assembling the cups one within the other. It has been found that when these cups are assembled with the seams formed by the overlapping edges of the wings 5 and 6, all on the same side of the stack, the resultant stack follows a curvilinear path which mitigates against their being shipped in, or dispensed from, a rectilinear container.

I have therefore provided for the stacking of these cups with the seams of the alternate cups of the stack on opposite sides of the stack, which results in the production of a rectilinear stack and overcomes the storage and dispensing disadvantage heretofore pointed out.

Moreover I have provided a method of and means for positively stacking these cups in the position specified above so that they will be positively removed from the machine as they are formed and will be positively positioned in a stack.

Referring now to the embodiment of the machine illustrated in the drawings by means of which the cups may be formed and stacked, and which exemplified one manner of carrying out the method, the supply of blanks 1 is indicated at 10. The blanks are supported by bars 11 of an open end hopper and are guided by rods 12 which engage in the notches 13 of the blank. The blanks are capable of being pulled from the hopper between the bars 11 by means of a suction finger 14, which is pivoted at 15 and is adapted to remove the blanks in sequence from the hopper and feed them into a position between a feed roll 16 and cooperating feed discs 17 which are mounted on a shaft 19 in spaced relation to each other (only one of the discs being shown in Figure 6) and are adapted to engage the opposite wings 5 and 6 of the blank. The feed disc 17 may be driven by any well known and suitable mechanism and the feed roll 16 permitted to run idle, receiving its motion from the disc 17 through the intervening blank.

It will be noted that the feed roll 16 lies in the path of movement of the end of the suction finger 14 (see Figure 6) when it swings about its pivot 15 and to permit this swinging of the suction finger I have provided an arm 18 which is pivoted on the shaft 19 and which carries the bearing of the feed roll 16. A cam roller 20 is adapted to cooperate with a cam 21 mounted on a shaft 22 which may be driven in any suitable manner (not shown) to rock the arm 18 to move the feed roll 16 out of the path of movement of the end of the suction finger 14 when it is moving to and from position to engage the lowermost blank in the supply.

When the suction finger brings the blank to a horizontal position the feed roll 16 lies in the dotted line position 23 and out of the path of movement of the leading edge of the blank. After the blank has assumed its horizontal position with the wings 5 and 6 lying on the discs 17, the cam 21 rocks the feed roller 16 back into its full line (Figure 6) position so that the blank is then engaged between the roll 16 and the discs 17 and the movement of the discs 17 will advance the blank, drawing it completely from the supply. This advance leads the blank to the creasing rolls 24 and 25, which produce the crease 26' shown in dotted lines in Figure 1 about which crease the lip 3 is bent. The creasing is produced by a blade 26 in the roll 24 which cooperates with a notch 27 in the roll 25.

The blank with the creased flap 3 as the leading edge then passes beneath the stationary guides 28 which engage the wings 5 and 6 of the blank. These wings are also engaged by the spaced upper feed discs 29 and the spaced lower feed discs 29' which likewise engage the wings of the cup and feed the blank forwardly. An applicator 30 which rotates with the shaft 31 on which the discs 29 are mounted is adapted to apply the adhesive 2 to the flap 3 as the flap passes between the discs 29 and 29'. This applicator cooperates with a support 30' for the flap which support rotates with the shaft 30'' on which the lower discs 29' are mounted. The applicator receives its adhesive through rolls 32 and 33 the latter of which is partly submerged in an adhesive in the reservoir 34. At a time interval after the application of the adhesive 2 the blank continuing to be guided by the guides 28 passes beneath a transverse folding bar 35 which serves to fold the flap 3 down on to the body of the blank, the folding having been initiated by the guides 28 after creasing by the blade 26 and the adhesive having been wiped on the creased flap.

Beyond the folding bar 35 pressure rollers 36 and 37 are mounted, the roller 37 being mounted only for rotative movement. The roller 36 is mounted on a frame 38 which is pivoted at 39 and the free end 40 of which is moved downwardly by a spring 41 to exert pressure between the rolls.

As the leading edge of the blank passes beneath the guide bar 35 it is taken up by the pressure rollers 36 and 37 which apply pressure to the flap 3 and seal it to the body of the blank. As the blank, with the flap 3 now sealed to it, is fed forwardly by the feeding action of the rollers 36 and 37, it passes between the spaced discs 42 and the spaced discs 43 which feed it forwardly. At the same time adhesive 4 is applied to one of the long edges of the blank (see Figure 2) by the applicator 45, which receives its adhesive from a suitable source, while the blank remains in a flat condition. The blank is then caused to follow the contour of the lower guide discs 43 by a stationary guide 46 and it passes between the lower guide disc 43 and the eccentric roller 47 which alternately grips and releases the blank between itself and the discs 43. By this eccentric roller and the lower guide discs 43 the blank is fed to a turret which will now be described.

This turret is illustrated in Figures 6 and 7. As illustrated in Figure 6 it lies directly below the feed discs 43 and the eccentric feed roller 47. The turret is mounted on a shaft 48. The turret 49 carries a plurality of outstanding radial spaced form plates 50 (see Figure 7) which are rigid with the rotor and are slightly tapered in longitudinal section and which, preferably, have rounded edges. Adjacent each of these plates a gripping plate 51 is mounted. This plate is carried by a rock shaft 52 which is actuated in a manner later described and is normally urged toward the stationary form plate 50 by a spring 53.

As the blank is fed downwardly by the discs 43 and the eccentric roller 47 it passes between the form plate 50 and the gripping plate 51. After it reaches its destination it is loose and free to move between the two plates and it is freed by the eccentric roller 47 whose small radius at this time moves opposite the discs 43.

In order to properly position the blank while it is in its loose condition the two fingers 54 are mounted on a rock shaft 55 and are moved downwardly into engagement with the notches 13 of the blank to vertically position the blank. The rock shaft 55 is actuated by a cam 55' on the shaft of the feed discs 42. This cam cooperates with a cam roller 56' on a rod 57' that is connected to a crank shaft 58' on the rock shaft 55.

Figure 9:
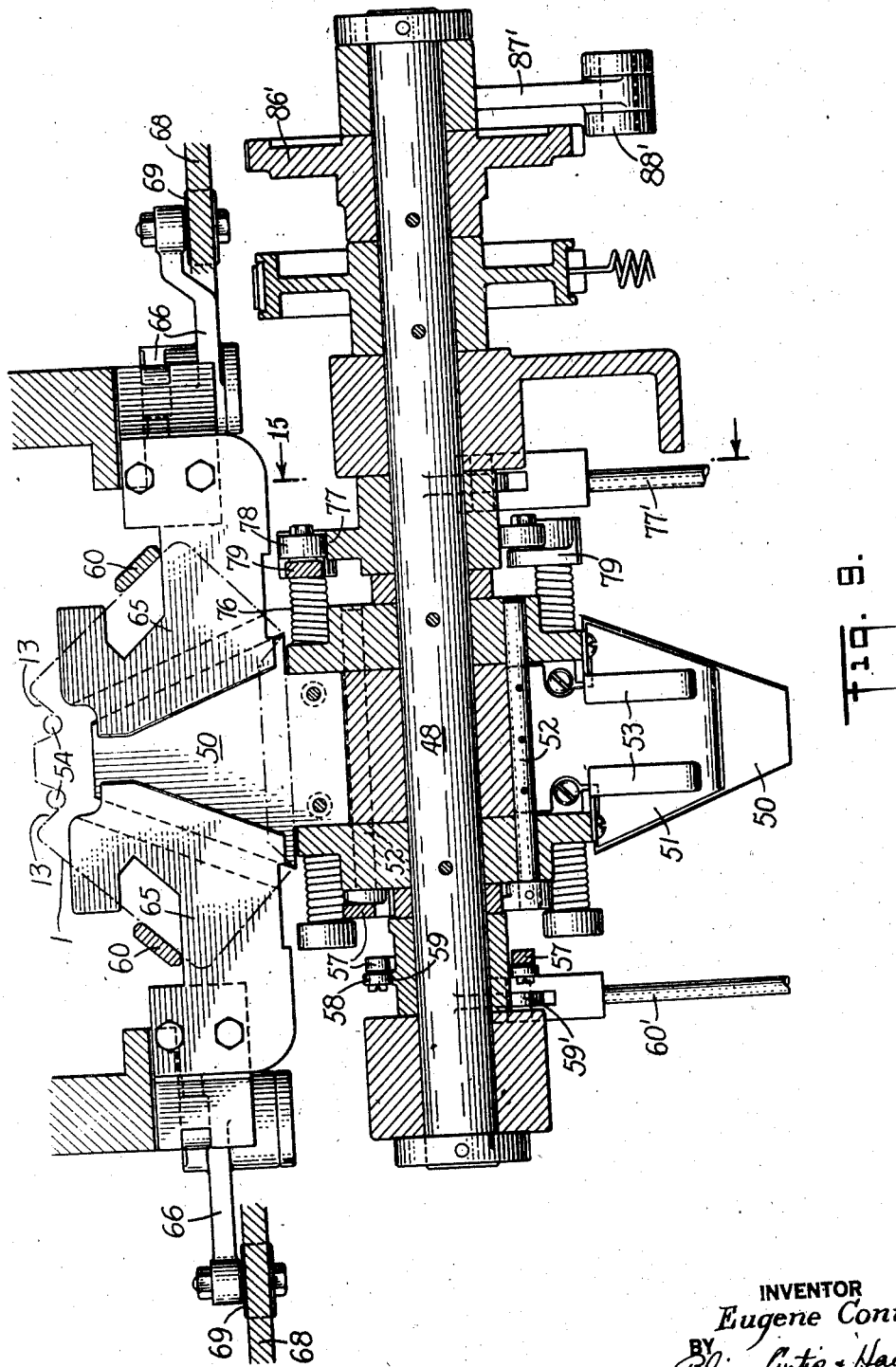
Figure 9 is essentially a sectional view showing the mechanism for positioning the blank and for folding the side wings into overlapping condition.
Figure 10:
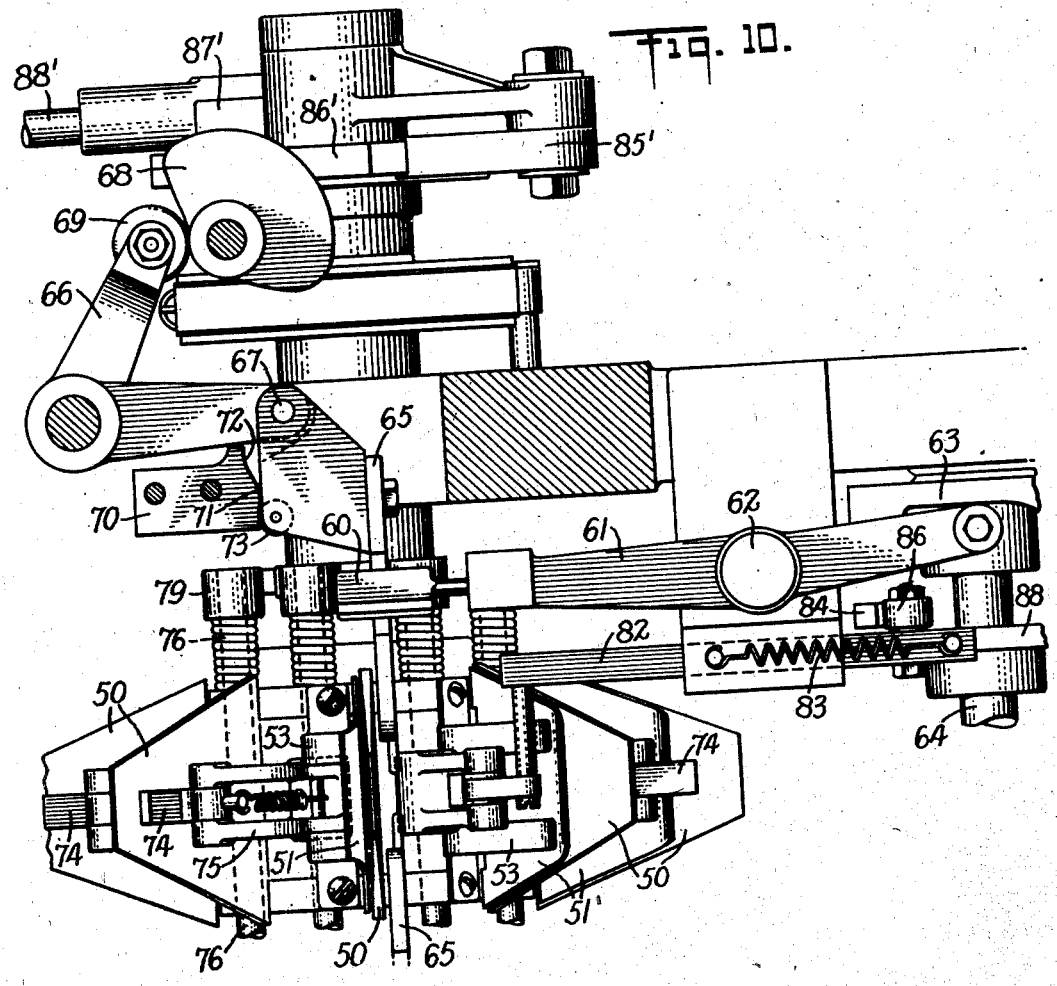
Figure 10 is a horizontal view showing portions of the positioning and folding mechanism shown in Figure 9.
Figure 15:
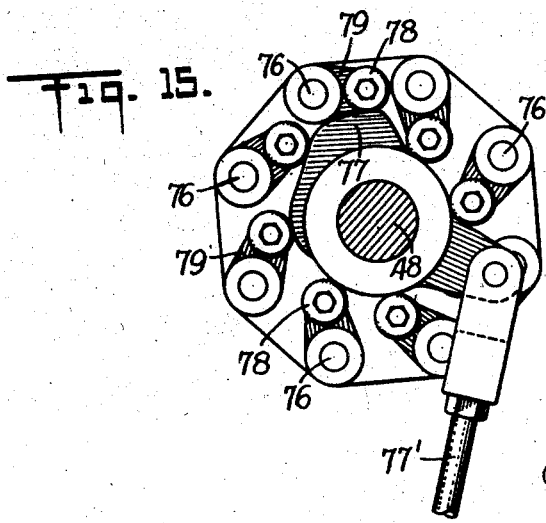
Figure 15 is an enlarged view of the mechanism for actuating the mechanism for exerting pressure on the cup blank when the wings are folded.

In order that the blank may be centered laterally on the form plate 50 I have provided a pair of lateral positioning fingers 60, see Figure 9, each of which is carried by a lever 61 pivoted at 62 (see Figure 10) and oscillated by a cam 63 on the shaft 64. These lateral positioning fingers move to lightly engage the edges of the wings 5 and 6 of the blank so that in cooperation with the fingers 54 the blank is positioned on the form plate 50 so that it may be properly folded thereon.

After this positioning of the blank the gripping plate 51 moves on its pivot under the influence of the spring 53 to grip the blank between itself and the form plate 50.

During the positioning of the blank between the plates 50 and 51 the spring 53 is rendered inoperative by a rocker arm 57 which is secured to the shaft 52 and has a cam roller 58 on the end thereof. This rocker arm 57 is actuated to move the gripping plate 51 about its pivot against the action of the spring 53 by a cam 59 which is loosely mounted on the shaft 48. From this cam an arm 59' extends. Pivotally connected to this arm 59' is a rod 60' that is connected at its lower end to a rocker lever 61' which is pivoted on the shaft 62' and which carries on its opposite end a cam roller 63'. This lever 61' is actuated by a cam 64' on the shaft 102.

While being held in this position the wings 5 and 6 of the blank are folded around the form plate 50 so that the adhesive covered edge 4 of the wing 5 overlies the edge of the wing 6. This folding is accomplished in the following manner and by the following mechanism.

Two wipers 65 (see Figure 9) are mounted to reciprocate toward and away from each other and across the face of the form plate 50 that is remote to the gripping plate 51. The reciprocation of each wiper is caused by a bell crank 66 (see Figure 10) that is pivotally connected at 67 to the plate and is actuated by a cam 68 against which a roller 69 on the bell crank operates. It is not possible to have these reciprocating wipers move in a rectilinear direction because they must first go behind the wings 5 and 6 of the blank then fold around the edge of the form plate 50 and then over the face of the form plate. Therefore I have provided a cam 70 having a hill 71 and a dale 72 on which a roller 73 carried by the wiper is adapted to travel. When each wiper 65 moves away from and beyond the edge of the form plate 50 the roller 73 moves from the hill 71 of the cam 70 to the dale 72 which in cooperation with the bell crank tilts the wiper to such a position that its direction is toward the back of the form plate 50 which is the position that it occupies when the blank is fed between the form plate 50 and the gripping plate 51 and which it continues to occupy until the blank is gripped in position. When the bell crank moves in the opposite direction under the influence of the cam 68 the cam roller 73 rides up on the hill 71 of the cam 70 during the initial travel of the wiper 65 toward the form plate 50. This combined action caused by the bell crank 66 and the cam 70 causes the end of each wiper to engage behind the extended end of one of the wings 5 or 6 of the blank so that the wing is folded around the edge of the form plate 50. By the time this folding of the wings of the blank around the edges of the form plate 50 is complete, the wiper 65 occupies a position such that it is directed across the face of the form plate. The continued movement of each wiper 65, under the influence of the bell crank 66, moves the wiper across the face of the form plate 50 and folds the wing of the blank thereover.

It is to be understood, of course, that both of the wipers operate at the same time. However, the operation of the wiper which folds the wing 5 carrying the adhesive 4 is slightly later than that of the other wiper with the result that the wing 6 is first folded in position and the wing 5 then folded over the wing 6 so that the adhesive 4 will engage the outside surface of the wing 6.

In order that the two wings 5 and 6 of the blank may be caused to be secured together by the adhesive 4 a pressure shoe 74 is provided (see Figure 7). This shoe is mounted on an arm 75 that is secured to a shaft 76 carried by the turret 49. This shaft 76 is actuated by a cam 77 on the shaft 48 through the intermediary of a cam roller 78 carried by an arm 79 which is rigid with the shaft, so that the arm 75 occupies the position shown at the immediate right of the form plate 50 in Figure 7 while the blank is being fed between the gripper plate 51 and the form plate 50, and is moved into the position shown to the immediate left of the form plate in Figure 7 after the blank has been positioned between the form plate and the gripper plate. This latter position the arm will continue to occupy during the rotation of the turret 49 until the completed cup is ready to be released to the outgoing feed mechanism, as will later be pointed out.

The cam 77 which is rotatable on the shaft 48 is actuated to control the shaft 76 and consequently the arms 75 by a rod 77' that is connected at its lower end to a lever 78' which is pivoted on the shaft 62' and which carries on its opposite end a cam roller 79' which cooperates with a cam 80' on the shaft 102.

One shoe 74 is pivotally mounted at 80 on each arm 75 and is normally swung about its pivot into the position illustrated at 81 in Figure 7 so that it may adjust itself to the flaps 5 and 6 after they have been folded over the form plate.

However, in this position 81 the shoe would interfere with the folding of the flaps 5 and 6 around the form plate. Therefore, to move the plate into the position shown at the immediate right of the form plate 50 in Figure 7, and to hold it in such position during the folding of the flaps, I have provided the following mechanism:

A reciprocable rod 82 is normally urged into contact with the shoe as illustrated in Figure 7 by a spring 83 to hold the shoe in such position that the flaps 5 and 6 of the blank may be folded without interference. This rod 82 is moved out of, and held out of, engagement with the shoe by a bell crank lever 84 which is pivoted at 85 (see Figure 6). One arm of this bell crank lever cooperates with a roller 86 on the rod 82 and the other arm, which carries a cam roller 87, with a cam 88 mounted on the shaft 64.

After the blank has been fed between the form plate 50 and the gripper plate 51 and the flaps 5 and 6 have been folded over the form plate so that the adhesive 4 overlaps the edge of the flap 6, the arm 75 is moved about its pivot 76 by the cam 77 (before the turret moves), bringing the shoe 74 into pressure contact with the overlapping flaps 5 and 6, sealing the flaps together and at the same time clamping the partially formed cup to the form plate 50.

Thus in this position, which is designated A on Figure 7 the cup has been partially formed and is in the condition shown in Figure 3 except that the crease 9 will not have been formed and the adhesive 9' will not have been applied at this time.

The turret 49 then moves in an intermittent or step-by-step motion in a counter clockwise direction in Figure 7 carrying the blank to the position B while the blank is still clamped to the form plate. This step-by-step or intermittent motion of the turret 49 is caused by a pawl 85' which engages successively the teeth of a ratchet 86' and is connected to a lever 87' pivoted on the shaft 48 which is actuated by a rod 88' that has eccentric connection with the shaft 167 at 90'. It then moves to the position C.

In order that the crease 9 (see Figure 3) may be formed I have provided an anvil 90 which is pivoted at 91 and the lower end of which lies to the left of the position shown in Figure 6 out of the path of movement of the flap of the cup while the cup is moved into the position C. The lower end of this anvil 90 is moved in to the position shown in Figure 6 by a cam 92 on the shaft 30" against which a roller 93 on the arm 94 of the anvil operates.

A creaser arm 95 is pivoted at 96 and is adapted to forcibly swing upwardly into contact with the side of the bottom flap of the cup opposite the anvil 90 so that, in cooperation with the anvil, it produces the crease 9. This creaser arm is actuated by an arm 97 to which a rod 98 is connected. This rod is, in turn, connected to an angular lever 99 having a roller 100 thereon, which bears against and is actuated by a cam 101 on a shaft 102. The co-relation of the actuating mechanism for the anvil 90 and creaser arm 95 is such that the anvil is first moved to overlie the flap of the cup and then the creaser arm is brought into forcible contact with the opposite side of the cup to produce the crease in cooperation with the anvil 90.

From this position C in the step-by-step movement of the turret the cup then moves to the position D (see Figure 6). While in this position an adhesive applicator roller 103 which is rotated by suitable mechanism and which obtains its adhesive from a roller 104 in the adhesive supply reservoir 105, wipes the adhesive 9' on to the flap. This roller 103 lies against the adhesive supply roller 104 while the cup is moving from the position C to the position D and is moved to its applying position as shown in Figure 6 by the following mechanism:

The roller is mounted on an arm 106 which is pivoted at 107. At 108 on a sliding pivot connection, a rod 109 is connected. The opposite end of this rod 109 carries a roller which is operated by a cam 110 to rock the arm 106 to carry the roller 103 to the supply roll 104 or to the bottom flap of the cup. With the adhesive 9' thus applied the cup moves to the position E, Figure 6, and then to the position F, Figure 6. From the position F the cup is then carried by the step-by-step movement into the position G, Figure 6, where the bottom flap is ready to be folded over so that the adhesive will adhere to the body of the cup and close its bottom.

This closing is accomplished by a pair of pressure rollers 111, the upper of which is spring mounted and capable of vertical movement and the lower of which is driven. These rollers are carried by an angular lever 112 pivoted at 113 and has a roller 114 on its lower end. This roller operates on a cam 115 on a shaft 102. While the cup is being moved from the position F to the position G, the cam 115 causes the rollers 111 to be held out of the path of movement of the bottom flap of the cup, but when the cup reaches the position G the rollers move toward and over the bottom of the cup, folding the flap on the body of the cup and exerting pressure on the flap so that it is sealed and the bottom of the cup closed. The cup is now completed and is in position to be ejected from the machine.

When the cup reaches the position G and is being fed from the form plate 50 by the rollers 111 to the ejecting mechanism the pressure on the shoe 74 and on the gripping plate 51 is released by the actuating cam for the arm 75. After the release and removal of the cup the rotor continues its step-by-step movement and the arm 75 moves to the position H at which time the shoe 74 will be swung about its pivot under the influence of its actuating spring. From this position H the arm 75 will then move into the position A (see Figure 6) and the cycle will then be repeated.

It is of course to be understood that when one cup is going through the operations to which it is subjected in position A, the next preceding cup will be going through the operations to which it is subjected in position C; a second preceding cup will be going through the operations to which it is subjected in the position D and a third preceding cup will be going through the operations to which it is subjected in the position G. At the same time the completed cups will be ejected from the forming portion of the machine and stacked by the following described mechanism and method.

Beyond the rollers 111 which feed the completed cups from the turret are two horizontal pairs of suitably driven spaced vertically arranged pulleys 116 and 117, around the pulleys of which pairs cooperating belts 118 and 119 are arranged so that their adjacent horizontal reaches 120 lie in contact and move in the same direction, i. e. away from the rollers 111 and at substantilly the same speed. This movement of course is caused by driving the pulleys of the upper horizontal pair 116 in a counter clockwise direction and the pulleys of the lower horizontal pair 117 in a clockwise direction by a suitable mechanism.

As the completed cup is fed by the rollers 111 forwardly the leading edge is taken up by the reaches 120 of the belts and the cup is fed toward the delivery end of the machine, being carried between the reaches 120 of the belts with the seam of the cup lying longitudinally between these reaches and with the base or bottom of the cup forming the leading edge.

A cup positioning mechanism is located beyond the ends of the belts 118 and 119 and is adapted to receive the cups from these belts. This mechanism is illustrated in Figures 6, 11, 12 and 13. It includes a stationary support 121 (see Figures 11 and 12) having an opening 122 therein through which the cups are adapted to pass. An oscillating delivery head 123 is mounted on the support 121 and is held in place by a ring 124. This delivery head comprises a base portion and an extending reduced neck portion 125. The base is provided with an annular portion 126 which is supported in the support 121 on suitable bearing surfaces so that it may be oscillated. The base is also provided with a circular recess at 127 which is flared at 128. Additionally the base and neck portions are provided with slots 129 and 130 that extend at right angles to each other, as shown in Figure 12 and extend completely through the base and the neck portion longitudinally. The slots 129 and 130 in the base portion of the delivery head are enlarged as at 131 (see Figure 12) to receive the expanded edges of the cup, the expansion of which is due to the fact that the edges indicated by the lines 8 in Figure 2 are preferably not creased but simply rolled. This delivery head is oscillated by means of a quadrant 132 the teeth of which intermesh with teeth 133 on the delivery head. This quadrant is pivoted at 134 and its oscillating movement is caused and controlled by a cam 135 which cooperates with a roller 136 on the quadrant and a spring 137 which holds the roller 136 in engagement with the cam 135. Thus, looking at Figure 12, the quadrant will be moved to the left by the cam 135 which will oscillate the delivery head in a clockwise direction. The quadrant will be moved in the opposite direction to oscillate the delivery head in a counter clockwise direction when the cam 135 moves to assume the position shown in Figure 12, under the influence of the spring 137.

This cam 135 is actuated by intermeshing gears 138, one being rigid with the cam and the other carried by a shaft 139.

In Figure 11 three successive positions of the cup are indicated in construction lines. These positions are designated respectively J, K and L. As a cup is being fed from the reaches 120 of the belts 118 and 119 it lies in the position J. From this position it is fed, by mechanism which will later be described, into the position K with its trailing edge 140 lying beyond the face of the ring 124. From this position K it is fed into the position L by a mechanism which will later be described and beyond this position into the receiver 141 in which it is stacked with other cups.

Referring now to the mechanism which moves the cups from the position J to the position K and directing attention to Figure 6, this mechanism includes a bell crank 142 which is pivoted on a stationary pivot at 143. On one arm of the bell crank a roller 144 is mounted, which roller rides upon and cooperates with a cam 145 on the shaft 139. On the end of the other arm of the bell crank a cup advancing fingers 146 is pivoted at 147. This pivotal connection is such that frictional pressure will always be exerted on the advancing finger 146 to maintain it in the various positions into which it is moved. A pivoted arm 148 which is pivoted on a stationary pivot 149 and provided with a cam 150 is connected with a rod 151. This rod carries a roller 152 which rides upon and cooperates with a cam 153 on the shaft 139 to move the lever 148 about its pivot 149.

I have described one advancing finger 146 and one lever 148 but it will be seen from Figure 11 that there are two such advancing fingers 146 and two such levers 148.

When the cup is in the position J in Figure 11 the toes 154 of the advancing fingers 146 lie behind the trailing edge of the cup, as illustrated in Figure 11, and in the position shown in Figure 6. The rotation of the cam 145 rocks the bell crank lever 142 about its pivot 143 (see Figure 6) to move the end of the bell crank lever, that carries the advancing finger, in a clockwise direction. This movement carries with it the advancing fingers and the toe portions 154 of the advancing fingers, engaging the trailing edge of the cup, push the cup into the position K (see Figure 11). The pushing of the cup beyond the base of the delivery head into this position K is made possible because of the presence of the recess 127 into which the toe portions of the advancing fingers move.

While one cup is being moved from the position J to the position K another cup is being advanced to the position J by the belts 118 and 119 so that it is obvious that the toe portions 154 of the advancing fingers 146 must be moved out of the line of travel of the succeeding cup in order to prevent their engagement with the leading edge of the cup and their interference with the advance of the cup. As the advancing fingers 146 are moved rearwardly by the counter clockwise movement of the end of the lever 142 to which the advancing fingers are pivoted, pins 155 on the advancing fingers 146 engage the cams 150 on the levers 148. As the fingers continue to move to a retracted position the cooperating pins 155 and cams 150 depress the toe portions 154 of the advancing fingers 146 to positions out of the path of movement of the advancing cup.

After the toe portions have reached a position beyond the trailing edge of the cup when it lies in the position J tail portions 156 on the advancing fingers 146 engage abutments 157 so that the continued and final movement of the lever 142 causes the fingers 146 to move in a counter clockwise direction in Figure 6 to again move the toe portions 154 up behind the trailing edge of the cup in the position J. The cycle is then completed and the cup which at this time occupies the position J is then advanced to the delivery head.

In order that the cup may be removed from the delivery head into a receiver and there stacked I have provided a delivery plate 158 (see Figures 11 and 12) which is provided with two arms at 159 that are adapted to lie behind the trailing edge of the cup when it is in the position K so that the cup may be moved to the receiver by these arms.

This delivery plate is rigidly mounted on a slide 159' which is adapted to be reciprocated in the frame by the following mechanism. The slide carries a roller 160 (see Figure 13) with which a bell crank 161 pivoted at 162 cooperates. A cam roller 163 is mounted on this bell crank and cooperates with a cam 164. The contact between the end of the bell crank 161 and the roller 160 is maintained by a spring 165 and the contact between the cam roller 162 and the cam 164 is maintained by a spring 166. Thus the cam 164 acts through the lever 161 and the roller 160 to move the delivery plate 158 from a position adjacent the base of the delivery head to and beyond the position shown in Figure 11 of the drawing. As the cam rotates, however, the spring 166 returns the delivery plate from the position shown in Figure 11 to the initial position described, which position is illustrated in Figure 11 in construction lines and is designated by the reference character M. Thus the movement of the delivery plate 158 under the influence of the cam 164 moves the cup toward the receiver and this movement, being rapid, as the cup leaves the reduced neck portion 125 of the delivery head the cup is kicked into the receiver and stacked or nested with other cups that have previously reached the receiver.

It is here pointed out that when a cup is being moved into the delivery head, the arms 159 of the delivery plate lie in the dotted construction line position M shown in Figure 11 and in the position shown in Figure 12, thus covering the ends of the slot 130 but leaving the horizontal slot 129 free. It is into this slot 129 that the cup is fed.

After the cup reaches the position K (see Figure 11) where it lies horizontally in the slot 129 (see Figure 12) the quadrant 132 oscillates the delivery head in a clockwise direction so that the slot 129 is moved from its horizontal position to a vertical position such as occupied by the slot 130 in Figure 12. This partial rotation of the delivery head carries the cup with it so that the cup is moved from a horizontal position to a vertical position and the arms 159 of the delivery plate 158 lie behind the trailing edge of the cup so that when the delivery plate is advanced the cup will be pushed forwardly to the receiver.

As has been pointed out, the overlapping edges of the wings 5 and 6 of the cup, that is to say, the longitudinal seam of the cup lies between the belts 118 and 119 so that it is fed to the delivery head substantially coaxial with the head with the seam downwardly.

Looking at Figure 12, when the slot 129 with the cup therein is moved to the vertical position the seam of the cup will lie to the left of the vertical and in this position the cup is moved into the receiver. When, however, the delivery head is oscillated in the opposite direction the cup, which is received by the slot 130 when it is in its horizontal position, is moved with the delivery head so that the seam of the cup lies to the right of the vertical and in this position it is moved into the stack and nested.

Thus the seams on the alternate cups will be on the opposite sides of the stack and the stack will therefore, and because of this alternate arrangement of the seams, assume a rectilinear rather than a curvilinear condition from which flow the advantages which have been heretofore pointed out.

The various mechanisms are actuated from a power shaft 167 which is actuated by a gear 168 that meshes with a pinion 169 on a pulley shaft 170. The pulley 171 is in turn actuated through a belt 172 by a suitable source of power 173. The means for distributing the power to the various operating mechanisms has been more or less conventionally represented. The power to the mechanism which precedes the feeding of the cup blank to the forming plate is actuated by power transmitting means 174 and through intermeshing gears such as 175 mounted on the various shafts of this mechanism.

Power is also transmitted from the shaft 167 to the turret mechanism and the mechanism that cooperates therewith in the formation of the cup and the removal of the cup from the turret by power transmitting means 176. The shaft 102 receives its power directly from the shaft 167. Power is transmitted to the delivery mechanism by means 177 and to the shaft 139 by means 178.

I have conventionally illustrated this power transmitting mechanism because the specific mechanisms are well known. The power being distributed from a single source the various cams and other mechanisms are thus timed so as to convey the blank and form it into a cup and deliver it in the stacked relation that I have described at the proper time.

Thus it will be seen that I have provided a machine and a method wherein the blank from which the drinking cup is to be formed will be drawn from the bottom of a supply stack, the lip portion will be creased and the lip flap then folded over on to the body of the cup and sealed thereto by an adhesive. Adhesive will then be applied to the edge of one of the wings of the cup blank, the blank will then be positioned on a folding plate which is part of a turret that carries a series of folding plate. The wings of the blank will then be folded, one over the other, and sealed together. The bottom of the thus partly formed cup will then be creased and adhesive applied thereto. The bottom of the blank will then be folded over on to the body of the envelope and sealed, thus completing the cup.

I have also provided for the sequential carrying out of these operations so that a series of blanks will be operated upon simultaneously in such manner that the several blanks of a series will simultaneously receive the sequential forming operations.

As the blanks are formed into cups they will be fed from the forming operations and mechanisms into a delivery mechanism which will deliver the cups into a receiver and stack them in a nest with the longitudinal seams of the alternate cups arranged upon opposite sides of the stack to insure a rectilinear stack.

The result of these operations and of this method will be the rapid formation of cups and the production of stacks of cups which will be in such condition that they may readily be packed for shipment in containers and accurately may be placed in rectilinear dispensers.

In the drawings I have illustrated the cup as having the seam extending longitudinally or lengthwise thereof and parallel with the lengthwise axis of the cup. However, I wish it to be understood that when I refer to a longitudinal seam I am not confining myself to one that extends parallel to the lengthwise axis of the cup for indeed it may extend at an angle to the axis and even then not completely from the top to the bottom of the cup. The invention in some of its phases is still applicable to and contemplates the formation and stacking of the cup which has its seam extending more nearly crosswise than lengthwise of the cup.

While I have illustrated and described a particular machine as embodying one phase of my invention, and also detailed steps of the method, it is to be understood that I do not wish to be limited to the construction of the particular machine disclosed and described or to the detailed method except in so far as this is necessitated by the claims.

What I claim is:

1. In a cup forming machine in which adhesive is applied to one edge of one of two wings of a blank, the wings are folded over the body portion of the blank with the adhesive coated edge of one wing overlying the adjacent edge of the other wing, pressure is applied to the overlapping edges of the wings to seal the same together into a seam, adhesive is applied to a bottom flap of the blank, the bottom of the blank is folded over the aforementioned seam, and pressure is applied to the bottom flap to seal the bottom to the body portion of the cup, the combination with a turret having means thereon for receiving and loosely supporting a blank after the application of the adhesive to the edge of one of the wings, means for positioning the blank both longitudinally and transversely in the supporting means, and means for clamping the blank in the supporting means, of means for folding the wings of the blank so that the adhesive coated edge of one of the wings overlies the adjacent edge of the other wing to form a seam, means for exerting pressure on the seam to cause the adhesion of the wings, means for transversely creasing the bottom of the thus partially formed cup, means for applying an adhesive to the bottom flap of partially formed cup, means for folding the creased bottom and bottom flap of the partially formed cup along the line of crease and for exerting pressure on the thus folded bottom to seal the flap to the body of the cup, and means for imparting a step-by-step rotation to the turret so that its periods of rest will occur while the wings are being folded, the bottom creased, the adhesive applied to the bottom flap and the bottom folded and secured on to the body of the cup.

2. In a cup forming machine in which adhesive is applied to one edge of one of two wings of a blank, the wings are folded over the body portion of the blank with the adhesive coated edge of one wing overlying the adjacent edge of the other wing, pressure is applied to the overlapping edges of the wings to seal the same together into a seam, adhesive is applied to a bottom flap of the blank, the bottom of the blank is folded over the aforementioned seam, and pressure is applied to the bottom flap to seal the bottom to the body portion of the cup, the combination with a turret having means thereon for receiving and loosely supporting a blank after the application of the adhesive to the edge of one of the wings, which means includes a stationary plate and a movable plate carried by the turret, means for positioning the blank both longitudinally and transversely in the supporting means, and means for clamping the blank in the supporting means, of means for folding the wings of the blank so that the adhesive coated edge of one of the wings overlies the adjacent edge of the other wing to form a seam, means for exerting pressure on the seam to cause the adhesion of the wings, means for transversely creasing the bottom of the thus partially formed cup, means for applying an adhesive to the bottom flap of said partially formed cup, means for folding the creased bottom and bottom flap of the partially formed cup along the line of creases and for exerting pressure on the thus folded bottom to seal the flap to the body of the cup, and means for imparting a step-by-step rotation to the turret so that its periods of rest will occur while the wings are being folded, the bottom creased, the adhesive applied to the bottom flap and the bottom folded on to and secured to the body of the cup.

3. In a cup forming machine in which adhesive is applied to one edge of one of two wings of a blank, the wings are folded over the body portion of the blank with the adhesive coated edge of one wing overlying the adjacent edge of the other wing, pressure is applied to the overlapping edges of the wings to seal the same together into a seam, adhesive is applied to a bottom flap of the blank, the bottom of the blank is folded over the aforementioned seam, and pressure is applied to the bottom flap to seal the bottom to the body portion of the cup, the combination with a turret having means thereon for receiving and loosely supporting a blank after the application of the adhesive to the edge of one of the wings, means for positioning the blank both longitudinally and transversely in the supporting means, which positioning means includes a pair of movable fingers adapted to engage the blank and position it longitudinally, and a pair of movable fingers adapted to engage the edge of the blank to position it laterally, and means for clamping the blank in the supporting means, of means for folding the wings of the blank so that the adhesive coated edge of one of the wings overlies the adjacent edge of the other wing to form a seam, means for exerting pressure on the seam to cause the adhesion of the wings, means for transversely creasing the bottom of the thus partially formed cup, means for applying an adhesive to the bottom flap of said partially formed cup, means for folding the creased bottom and bottom flap of the partially formed cup along the line of crease and for exerting pressure on the thus folded bottom to seal the flap to the body of the cup, and means for imparting a step-by-step rotation to the turret so that its periods of rest will occur while the wings are being folded, the bottom creased, the adhesive applied to the bottom flap and the bottom folded on to and secured to the body of the cup.

4. In a cup forming machine in which adhesive is applied to one edge of one of two wings of a blank, the wings are folded over the body portion of the blank with the adhesive coated edge of one wing overlying the adjacent edge of the other wing, pressure is applied to the overlapping edges of the wings to seal the same together into a seam, adhesive is applied to a bottom flap of the blank, the bottom of the blank is folded over the aforementioned seam, and pressure is applied to the bottom flap to seal the bottom to the body portion of the cup, the combination with a turret having means thereon for receiving and loosely supporting a blank after the application of the adhesive to the edge of one of the wings, means for positioning the blank both longitudinally and transversely in the supporting means, and means for clamping the blank in the supporting means, of means for folding the wings of the blank so that the adhesive coated edge of one of the wings overlies the adjacent edge of the other wing to form a seam, which folding means includes a stationary plate carried by the turret, a pair of wipers adapted to move behind the wings and then forwardly and across the face of the plate to fold the wings around the edges of the plate and across the surface thereof and means for actuating said wipers, means for exerting pressure on the seam to cause the adhesion of the wings, means for transversely creasing the bottom of the thus partially formed cup, means for applying an adhesive to the bottom flap of said partially formed cup, means for folding the creased bottom and bottom flap of the partially formed cup along the line of crease and for exerting pressure on the thus folded bottom to seal the flap to the body of the cup, and means for imparting a step-by-step rotation to the turret so that its periods of rest will occur while the wings are being folded, the bottom creased, the adhesive applied to the bottom flap and the bottom folded on to and secured to the body of the cup.

5. In a cup forming machine in which adhesive is applied to one edge of one of two wings of a blank, the wings are folded over the body portion of the blank with the adhesive coated edge of one wing overlying the adjacent edge of the other wing, pressure is applied to the overlapping edges of the wings to seal the same together into a seam, adhesive is applied to a bottom flap of the blank, the bottom of the blank is folded over the aforementioned seam, and pressure is applied to the bottom flap to seal the bottom to the body portion of the cup, the combination with a turret having means thereon for receiving and loosely supporting a blank after the application of the adhesive to the edge of one of the wings, means for positioning the blank both longitudinally and transversely in the supporting means, and means for clamping the blank in the supporting means, of means for folding the wings of the blank so that the adhesive coated edge of one of the wings overlies the adjacent edge of the other wing to form a seam, which folding means includes a stationary plate carried by the turret, a pair of wipers adapted to move behind the wings and then forwardly and across the face of the plate to fold the wings around the edges of the plate and across the surface thereof, and means for actuating said wipers, means for exerting pressure on the seam to cause the adhesion of the wings, which pressure means includes a shoe movable to and away from said plate, and means for moving said shoe into engagement with said seam while the folded blank is positioned on said plate, means for transversely creasing the bottom of the thus partially formed cup, means for applying an adhesive to the bottom flap of said partially formed cup, means for folding the creased bottom and bottom flap of the partially formed cup along the line of crease and for exerting pressure on the thus folded bottom to seal the flap to the body of the cup, and means for imparting a step-by-step rotation to the turret so that its periods of rest will occur while the wings are being folded, the bottom creased, the adhesive applied to the bottom flap and the bottom folded on to and secured to the body of the cup.

6. In a cup forming machine in which adhesive is applied to one edge of one of two wings of a blank, the wings are folded over the body portion of the blank with the adhesive coated edge of one wing overlying the adjacent edge of the other wing, pressure is applied to the overlapping edges of the wings to seal the same together into a seam, adhesive is applied to a bottom flap of the blank, the bottom of the blank is folded over the aforementioned seam, and pressure is applied to the bottom flap to seal the bottom to the body portion of the cup, the combination with a turret having means hereon for receiving and loosely supporting a blank after the application of the adhesive to the edge of one of the wings, means for positioning the blank both longitudinally and transversely in the supporting means, and means for clamping the blank in the supporting means, of means for folding the wings of the blank so that the adhesive coated edge of one of the wings overlies the adjacent edge of the other wing to form a seam, means for exerting pressure on the seam to cause the adhesion of the wings, means for transversely creasing the bottom of the thus partially formed cup, said means including a pivoted anvil, a pivoted pressure plate, means for moving said anvil and said pressure plate into pressure engagement with the bottom of the partially formed cup, and means for moving said anvil and pressure plate into and out of the path of movement of said partially formed cup, means for applying an adhesive to the bottom flap of said partially formed cup, means for folding the creased bottom and bottom flap of the partially formed cup along the line of crease and for exerting pressure on the thus folded bottom to seal the flap to the body of the cup, and means for imparting a step-by-step rotation to the turret so that its periods of rest will occur while the wings are being folded, the bottom creased, the adhesive applied to the bottom flap and the bottom folded on to and secured to the body of the cup.

7. In a cup forming machine in which adhesive is applied to one edge of one of two wings of a blank, the wings are folded over the body portion of the blank with the adhesive coated edge of one wing overlying the adjacent edge of the other wing, pressure is applied to the overlapping edges of the wings to seal the same together into a seam, adhesive is applied to a bottom flap of the blank, the bottom of the blank is folded over the aforementioned seam, and pressure is applied to the bottom flap to seal the bottom to the body portion of the cup, the combination with a turret having means thereon for receiving and loosely supporting a blank after the application of the adhesive to the edge of one of the wings, means for positioning the blank both longitudinally and transversely in the supporting means, and means for clamping the blank in the supporting means, of means for folding the wings of the blank so that the adhesive coated edge of one of the wings overlies the adjacent edge of the other wing to form a seam, means for exerting pressure on the seam to cause the adhesion of the wings, means for transversely creasing the bottom of the thus partially formed cup, means for applying an adhesive to the bottom flap of said partially formed cup, means for folding the creased bottom and bottom flap of the partially formed cup along the line of crease and for exerting pressure on the thus folded bottom to seal the flap to the body of the cup, said folding means including a pair of pressure rollers and means for moving the rollers into and out of the path of movement of the partially formed cup, and means for imparting a step-by-step rotation to the turret so that its periods of rest will occur while the wings are being folded, the bottom creased, the adhesive applied to the bottom flap and the bottom folded on to and secured to the body of the cup.

8. In a cup forming machine in which adhesive is applied to one edge of one of two wings of a blank, the wings are folded over the body portion of the blank with the adhesive coated edge of one wing overlying the adjacent edge of the other wing, pressure is applied to the overlapping edges of the wings to seal the same together into a seam, adhesive is applied to a bottom flap of the blank, the bottom of the blank is folded over the aforementioned seam, and pressure is applied to the bottom flap to seal the bottom to the body portion of the cup, the combination of a turret having a plurality of means for successively receiving and loosely supporting a series of blanks after the application of the adhesive to one edge thereof, means for positioning the successive blanks in the receiving and supporting means, and means for clamping the blanks to the receiving and supporting means, of means for folding the wings of successive blanks so that the adhesive coated edge of one wing overlies the adjacent edge of the other wing to form a seam, means for exerting pressure on the seam to cause the adhesion of the wings, means for transversely creasing the bottoms of the successive thus partially formed cups, means for applying adhesive to the bottom flap of the successive cups, means for folding the creased bottom and bottom flap over the body of the partially formed cup and applying pressure thereto to seal the flap to the body of the cup, and means for advancing the turret in a step-by-step movement to simultaneously arrest the movement of a plurality of blanks in cooperative relation with the wing folding means, the bottom creasing means, the bottom flap adhesive applying means and the means for folding the bottom and exerting pressure on the bottom flap of the cup whereby a plurality of cups are simultaneously formed.

9. In a cup forming machine in which adhesive is applied to one edge of one of two wings of a blank, the wings are folded over the body portion of the blank with the adhesive coated edge of one wing overlying the adjacent edge of the other wing, pressure is applied to the overlapping edges of the wings to seal the same together into a seam, adhesive is applied to a bottom flap of the blank, the bottom of the blank is folded over the aforementioned seam, and pressure is applied to the bottom flap to seal the bottom to the body portion of the cup, the combination of a turret having a plurality of means for successively receiving and loosely supporting a series of blanks after the application of the adhesive to one edge thereof, which means includes a stationary plate and a movable plate carried by the turret, means for positioning the successive blanks in the receiving and supporting means, and means for clamping the blanks to the receiving and supporting means, of means for folding the wings of successive blanks so that the adhesive coated edge of one wing overlies the adjacent edge of the other wing to form a seam, means for exerting pressure on the seam to cause the adhesion of the wings, means for transversely creasing the bottoms of the successive thus partially formed cups, means for applying adhesive to the bottom flap of the successive cups, means for folding the creased bottom and bottom flap over the body of the partially formed cup and applying pressure thereto to seal the flap to the body of the cup, and means for advancing the turret in a step-by-step movement to simultaneously arrest the movement of a plurality of blanks in cooperative relation with the wing folding means, the bottom creasing means, the bottom flap adhesive applying means and the means for folding the bottom and exerting pressure on the bottom flap of the cup whereby a plurality of cups are simultaneously formed.

10. In a cup forming machine in which adhesive is applied to one edge of one of two wings of a blank, the wings are folded over the body portion of the blank with the adhesive coated edge of one wing overlying the adjacent edge of the other wing, pressure is applied to the overlapping edges of the wings to seal the same together into a seam, adhesive is applied to a bottom flap of the blank, the bottom of the blank is folded over the aforementioned seam, and pressure is applied to the bottom flap to seal the bottom to the body portion of the cup, the combination of a turret having a plurality of means for successively receiving and loosely supporting a series of blanks after the application of the adhesive to one edge thereof, means for positioning the successive blanks in the receiving and supporting means, which positioning means includes a pair of movable fingers adapted to engage the blank and position it longitudinally and a pair of movable fingers adapted to engage the edge of the plate to position it laterally, and means for clamping the blanks to the receiving and supporting means, of means for folding the wings of successive blanks so that the adhesive coated edge of one wing overlies the adjacent edge of the other wing to form a seam, means for exerting pressure on the seam to cause the adhesion of the wings, means for transversely creasing the bottoms of the successive thus partially formed cups, means for applying adhesive to the bottom flap of the successive cups, means for folding the creased bottom and bottom flap over the body of the partially formed cup and applying pressure thereto to seal the flap to the body of the cup, and means for advancing the turret in a step-by-step movement to simultaneously arrest the movement of a plurality of blanks in cooperative relation with the wing folding means, the bottom creasing means, the bottom flap adhesive applying means and the means for folding the bottom and exerting pressure on the bottom flap of the cup whereby a plurality of cups are simultaneously formed.

11. In a cup forming machine in which adhesive is applied to one edge of one of two wings of a blank, the wings are folded over the body portion of the blank with the adhesive coated edge of one wing overlying the adjacent edge of the other wing, pressure is applied to the overlapping edges of the wings to seal the same together into a seam, adhesive is applied to a bottom flap of the blank, the bottom of the blank is folded over the aforementioned seam, and pressure is applied to the bottom flap to seal the bottom to the body portion of the cup, the combination of a turret having a plurality of means for successively receiving and loosely supporting a series of blanks after the application of the adhesive to one edge thereof, means for positioning the successive blanks in the receiving and supporting means and means for clamping the blanks to the receiving and supporting means, of means for folding the wings of successive blanks so that the adhesive coated edge of one wing overlies the adjacent edge of the other wing to form a seam, which folding means includes a stationary plate carried by the turret, a pair of wipers adapted to move behind the wings and then forwardly and across the face of the plate to fold the wings around the edges of the plate and across the surface thereof, and means for actuating said wipers, means for exerting pressure on the seam to cause the adhesion of the wings, means for transversely creasing the bottoms of the successive thus partially formed cups, means for applying adhesive to the bottom flap of the successive cups, means for folding the creased bottom and bottom flap over the body of the partially formed cup and applying pressure thereto to seal the flap to the body of the cup, and means for advancing the turret in a step-by-step movement to simultaneously arrest the movement of a plurality of blanks in cooperative relation with the wing folding means, the bottom creasing means, the bottom flap adhesive applying means and the means for folding the bottom and exerting pressure on the bottom flap of the cup whereby a plurality of cups are simultaneously formed.

12. In a cup forming machine in which adhesive is applied to one edge of one of two wings of a blank, the wings are folded over the body portion of the blank with the adhesive coated edge of one wing overlying the adjacent edge of the other wing, pressure is applied to the overlapping edges of the wings to seal the same together into a seam, adhesive is applied to a bottom flap of the blank, the bottom of the blank is folded over the aforementioned seam, and pressure is applied to the bottom flap to seal the bottom to the body portion of the cup, the combination of a turret having a plurality of means for successively receiving and loosely supporting a series of blanks after the application of the adhesive to one edge thereof, means for positioning the successive blanks in the receiving and supporting means, and means for clamping the blanks to the receiving and supporting means, of means for folding the wings of successive blanks so that the adhesive coated edge of one wing overlies the adjacent edge of the other wing to form a seam, which folding means includes a stationary plate carried by the turret, a pair of wipers adapted to move behind the wings and then forwardly and across the face of the plate to fold the wings around the edges of the plate and across the surface thereof, and means for actuating said wipers, means for exerting pressure on the seam to cause the adhesion of the wings, which pressure means includes a shoe movable to and away from said plate, and means for moving said shoe into engagement with said seam while the folded blank is positioned on said plate, means for transversely creasing the bottoms of the successive thus partially formed cups, means for applying adhesive to the bottom flap of the successive cups, means for folding the creased bottom and bottom flap over the body of the partially formed cup and applying pressure thereto to seal the flap to the body of the cup, and means for advancing the turret in a step-by-step movement to simultaneously arrest the movement of a plurality of blanks in cooperative relation with the wing folding means, the bottom creasing means, the bottom flap adhesive applying means and the means for folding the bottom and exerting pressure on the bottom flap of the cup whereby a plurality of cups are simultaneously formed.

13. In a cup forming machine in which adhesive is applied to one edge of one of two wings of a blank, the wings are folded over the body portion of the blank with the adhesive coated edge of one wing overlying the adjacent edge of the other wing, pressure is applied to the overlapping edges of the wings to seal the same together into a seam, adhesive is applied to a bottom flap of the blank, the bottom of the blank is folded over the aforementioned seam, and pressure is applied to the bottom flap to seal the bottom to the body portion of the cup, the combination of a turret having a plurality of means for successively receiving and loosely supporting a series of blanks after the application of the adhesive to one edge thereof, means for positioning the successive blanks in the receiving and supporting means and means for clamping the blanks to the receiving and supporting means, of means for folding the wings of successive blanks so that the adhesive coated edge of one wing overlies the adjacent edge of the other wing to form a seam, means for exerting pressure on the seam to cause the adhesion of the wings, means for transversely creasing the bottoms of the successive thus partially formed cups, said means including a pivoted anvil, a pivoted pressure plate, means for moving said anvil and said pressure plate into pressure engagement with the bottom of the partially formed cup, and means for moving said anvil and pressure plate into and out of the path of movement of said partially formed cup, means for applying adhesive to the bottom flap of the successive cups, means for folding the creased bottom and bottom flap over the body of the partially formed cup and applying pressure thereto to seal the flap to the body of the cup, and means for advancing the turret in a step-by-step movement to simultaneously arrest the movement of a plurality of blanks in cooperative relation with the wing folding means, the bottom creasing means, the bottom flap adhesive applying means and the means for folding the bottom and exerting pressure on the bottom flap of the cup whereby a plurality of cups are simultaneously formed.

14. In a cup forming machine in which adhesive is applied to one edge of one of two wings of a blank, the wings are folded over the body portion of the blank with the adhesive coated edge of one wing overlying the adjacent edge of the other wing, pressure is applied to the overlapping edges of the wings to seal the same together into a seam, adhesive is applied to a bottom flap of the blank, the bottom of the blank is folded over the aforementioned seam, and pressure is applied to the bottom flap to seal the bottom to the body portion of the cup, the combination of a turret having a plurality of means for successively receiving and loosely supporting a series of blanks after the application of the adhesive to one edge thereof, means for positioning the successive blanks in the receiving and supporting means and means for clamping the blanks to the receiving and supporting means, of means for folding the wings of successive blanks so that the adhesive coated edge of one wing overlies the adjacent edge of the other wing to form a seam, means for exerting pressure on the seam to cause the adhesion of the wings, means for transversely creasing the bottoms of the successive thus partially formed cups, means for applying adhesive to the bottom flap of the successive cups, means for folding the creased bottom and bottom flap over the body of the partially formed cup and applying pressure thereto to seal the flap to the body of the cup, said folding means including a pair of pressure rollers and means for moving the rollers into and out of the path of movement of the partially formed cup, and means for advancing the turret in a step-by-step movement to simultaneously arrest the movement of a plurality of blanks in cooperative relation with the wing folding means, the bottom creasing means, the bottom flap adhesive applying means and the means for folding the bottom and exerting pressure on the bottom flap of the cup whereby a plurality of cups are simultaneously formed.

15. In a cup forming machine a turret including a rotor, a plurality of substantially radially extending form plates rigidly carried by the rotor, a gripping plate pivotally carried by the rotor and arranged adjacent each form plate, means for moving each gripping plate toward the adjacent form plate, means for moving each gripping plate away from the adjacent form plate, an arm pivoted on the rotor adjacent each form plate, a shoe pivotally carried by the arm, and means for moving the arm to carry the shoe toward and away from the adjacent form plate whereby when the wings of a cup blank are folded over the form plate pressure will be alternately exerted on the overlapping edges of the wings and released.

16. In a cup forming machine a turret including a rotor, a plurality of substantially radially extending form plates rigidly carried by the rotor, a gripping plate pivotally carried by the rotor and arranged adjacent each form plate, means for moving each gripping plate toward the adjacent form plate, means for moving each gripping plate away from the adjacent form plate, an arm pivoted on the rotor adjacent each form plate, a shoe pivotally carried by the arm, means for moving the arm to carry the shoe toward and away from the adjacent form plate whereby when the wings of a cup blank are folded over the form plate pressure will be alternately exerted on the overlapping edges of the wings and released, and means for positioning the successive shoes in respect of the form plate while the wings of the cup are being folded over the form plate.

EUGENE CONTI.

REFERENCES CITED

The following references are of record in the file of this patent:

UNITED STATES PATENTS

| Number | Name | Date |
|---|---|---|
| 1,056,564 | Luttropp | Mar. 18, 1913 |
| 1,535,757 | Barbieri | Apr. 28, 1925 |
| 1,545,901 | Holman | July 14, 1925 |
| 1,642,913 | Von Glahn | Sept. 20, 1927 |
| 1,661,248 | Barbieri | Mar. 6, 1928 |
| 2,110,770 | Lucia | Mar. 8, 1938 |
| 2,206,228 | Henry | July 2, 1940 |
| 749,631 | Quenard | Jan. 12, 1904 |
| 2,255,982 | Labombarde | Sept. 16, 1941 |
| 2,028,163 | Novick | Jan. 21, 1936 |
| 2,276,318 | Labombarde | Mar. 17, 1942 |